Oct. 2, 1934.     C. H. BILTY     1,975,565
LOCOMOTIVE
Filed May 18, 1932
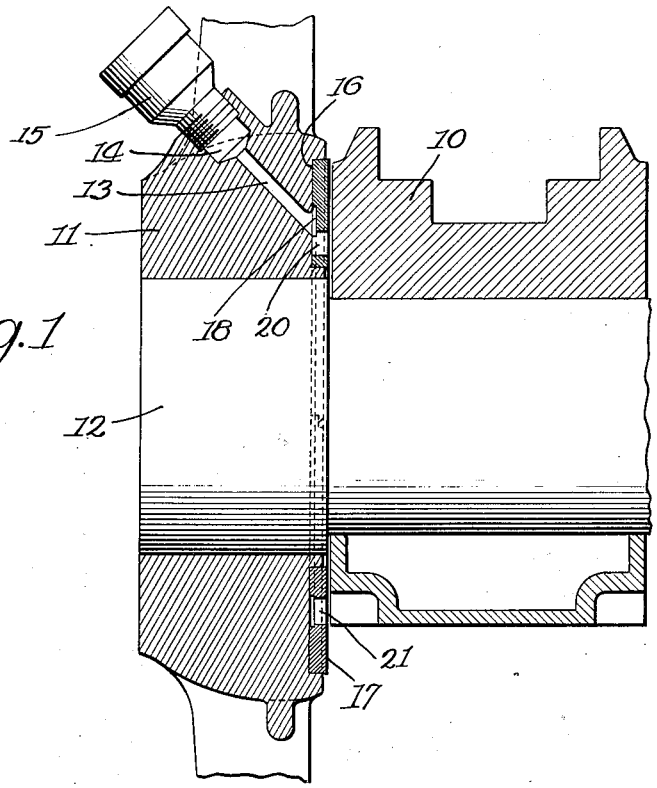
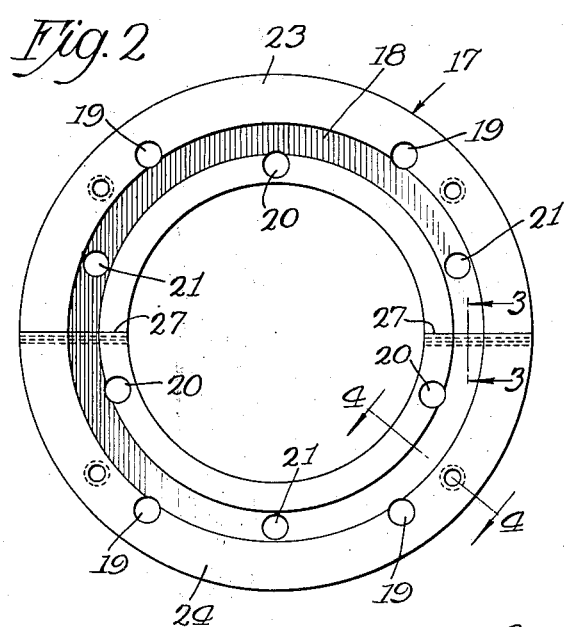
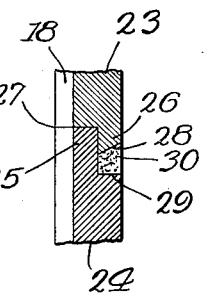
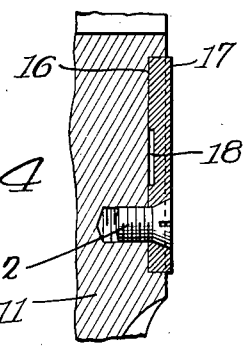
Inventor
Charles H. Bilty Patented Oct. 2, 1934

1,975,565

UNITED STATES PATENT OFFICE 1,975,565

LOCOMOTIVE

Charles H. Bilty, Milwaukee, Wis.

Application May 18, 1932, Serial No. 611,979

2 Claims. (Cl. 308—165)

Interstate Commerce Commission Inspection Rule No. 140 limits the lateral motion between the driving wheel hubs and the driving boxes of locomotives to three-quarters of an inch. The exposure to dust is great, the lubrication is generally poor, and hence, the wear is usually rapid.

In the older locomotives loss of metal or "increase of lateral" by wear is restored by removing the connecting rods, dropping the driving wheels, and pouring brass, Babbitt metal, or the like, on the worn hub faces. The average cost of this operation is about $35.00 per locomotive, and must be repeated after about 28,000 miles.

This extreme condition has been somewhat relieved by different expedients for lubrication and for replacement of worn parts, all of which have left a difficult and expensive feature of maintenance.

The principal object of this invention is to provide proper lubrication between the driving wheel hubs and the driving boxes whereby wear is greatly reduced, and to permit ready and cheap restoration after wear.

More specific objects of the invention will become apparent as the description is read in connection with the accompanying drawing in which—

Fig. 1 is a sectional view through a driving wheel hub and a driving box, with a portion of the driving axle shown in elevation;

Fig. 2 is a side elevation of a driving hub plate made according to this invention, and Figs. 3 and 4 are sectional views on the lines 3—3 and 4—4 of Fig. 2.

The driving box 10, the driving wheel hub 11, and a portion of the driving axle 12, are shown in Fig. 1 in somewhat conventional form.

The hub is provided with an inclined grease duct 13, enlarged at its outer end at 14, and equipped with a supply device illustrated as a conventional pressure grease cup 15.

The inner face of the driving hub is provided with an annular socket 16 to receive a hub plate, generally indicated in Fig. 1, by 17.

The face of the hub plate against the bottom of the socket 16 is provided with a continuous annular groove 18, and staggered rows of perforations 19, 20, intersect the edges of the groove 18, and provide communication between that groove and the opposite face of the ring which bears against the driving box 10. Another row of perforations 21 staggered with respect to 19 and 20 extend from the bottom of the grove 18 to the opposite face of the plate. Grease forced into the duct 13 passes into the groove 18 and thence into the perforations 19, 20 and 21, from which it is well distributed over the wearing face of the hub plate and the opposite face of the driving box.

The hub plate is made fast to the hub by four three-quarter inch patch bolts 22.

In order to make the hub plate easily applicable to hubs already assembled with axles it is made in two substantially semi-cylindrical pieces, generally indicated at 23, 24, Fig. 2, having flanges 25 and 26, shown in detail in Fig. 3, to form a lap joint. The flanges 25 and the corresponding body portion of the opposed piece butt, as indicated at 27, to make the groove 18 continuous and prevent the escape of grease at the joints which would interfere with the proper distribution. The flanges 26 have inclined faces 28 spaced from the corresponding shoulder 29 to provide a groove for welding metal 30. From this it will be seen that the plate sections can be easily assembled in hubs on axles and then readily welded to form, in effect, one plate.

In one embodiment that has been found eminently satisfactory, the hub plate is 23¼" outside diameter and 13¼" inside diameter and ½" thick. The thickness, of course, must vary somewhat with the wear to be restored or provided for; ordinarily a ⅛" projection from the face of the hub is good practice.

In this same embodiment the groove 18 is 1⅜" wide and ⅛" deep, the perforations 19, 20 and 21 are 1⅛" drilled holes, the first two extending ⅛" beyond the margin of the groove 18. The flange 25 is ⅜" in length and 3/16" thick and the flange 28 is approximately ¼" in length.

It will be apparent that the invention provides a copious supply and proper distribution of grease to the wearing surfaces of the driving hub and driving box, and also provides a readily replaceable plate for restoring the lateral after wear.

I claim as my invention—

1. In a locomotive driving wheel, a hub having an annular socket in one end and a grease duct communicating with the socket, a hub plate seated in the socket and having an annular groove in its inner side in register with the grease duct, said plate having means for conducting grease from the duct to the opposite side of the plate comprising a series of perforations in the groove and other series of perforations in the plate at a side of the groove and in communication therewith, said plate having a plane bearing surface.

2. In a locomotive driving wheel, a hub having a wide shallow groove in its inner face, a wide comparatively thin plate seated in said groove and having a plane bearing face and a channel on its inner face and provided with openings therethrough in communication with said channel for conducting grease to the bearing face from said channel, and means for clamping said plate to said hub and a passage leading from said channel to the exterior of said hub for conducting grease under pressure to said channel.

CHARLES H. BILTY.